US012227252B2

(12) United States Patent
Sawada

(10) Patent No.: US 12,227,252 B2
(45) Date of Patent: Feb. 18, 2025

(54) LOUVER MEMBER

(71) Applicant: SUZUKI MOTOR CORPORATION, Hamamatsu (JP)

(72) Inventor: Fujimi Sawada, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 683 days.

(21) Appl. No.: 17/462,382

(22) Filed: Aug. 31, 2021

(65) Prior Publication Data

US 2022/0073165 A1    Mar. 10, 2022

(30) Foreign Application Priority Data

Sep. 7, 2020   (JP) ................................ 2020-149718

(51) Int. Cl.
  *B62J 17/10*   (2020.01)

(52) U.S. Cl.
  CPC .................................... *B62J 17/10* (2020.02)

(58) Field of Classification Search
  CPC ............ B62J 17/10; B62J 17/02; B62J 17/00
  See application file for complete search history.

(56) References Cited

U.S. PATENT DOCUMENTS

| | | | | |
|---|---|---|---|---|
| 9,815,503 B2 * | 11/2017 | Tsukui | ..................... | B62J 25/02 |
| 9,868,486 B2 * | 1/2018 | Hagimoto | ................ | B62J 17/02 |
| 10,293,655 B2 * | 5/2019 | Hojo | ........................ | B62J 23/00 |
| 2014/0034267 A1 * | 2/2014 | Hojo | ........................ | B62J 23/00 |
| | | | | 165/51 |
| 2016/0280059 A1 | 9/2016 | Hagimoto et al. | | |

FOREIGN PATENT DOCUMENTS

| | | | |
|---|---|---|---|
| JP | H05-105152 A | | 4/1993 |
| JP | 2004291700 A | * | 10/2004 |
| JP | 2014-028604 A | | 2/2014 |
| JP | 2016-182916 A | | 10/2016 |

OTHER PUBLICATIONS

Extended European Search Report issued in EP 21194046.5 on Jan. 25, 2022.
Office Action issued in JP 2020-149718 on May 28, 2024 (with English translation).

* cited by examiner

*Primary Examiner* — Kevin Hurley
*Assistant Examiner* — Michael R Stabley
(74) *Attorney, Agent, or Firm* — TROUTMAN PEPPER LOCKE LLP

(57) ABSTRACT

A louver member, configured to be installed on a side cowl so as to cover an air discharge port of a straddle-type vehicle, is provided. The louver member includes a frame body including a first frame along a first side edge of the air discharge port and a second frame along a second side edge of the air discharge port opposite to the first side edge, a first arm portion crossing the air discharge port from the first frame to the second frame, and a second arm portion branching from the first arm portion and extending to the second frame.

5 Claims, 10 Drawing Sheets

LOUVER MEMBER

CROSS-REFERENCE TO RELATED APPLICATIONS

The disclosure of Japanese Patent Application No. 2020-149718 filed on Sep. 7, 2020, the contents of which is incorporated herein by reference in its entirety.

BACKGROUND

The present invention relates to a louver member.

As a straddle-type vehicle such as a motorcycle, a structure has been proposed in which hot air trapped inside the vehicle is blown to an outside of the vehicle by traveling wind (see, for example, JP-A-H5-105152). In the straddle-type vehicle described in Patent Literature 1, a front cowl on a vehicle front side is formed with an air introduction port for traveling wind, and a side cowl on a side of the vehicle is formed with an air discharge port for the traveling wind. When the straddle-type vehicle travels, the traveling wind is taken into the inside of the vehicle from the air introduction port of the front cowl, and the hot air inside the vehicle is swept away rearward by the traveling wind. Then, the hot air is discharged from the air discharge port of the side cowl to the outside of the vehicle together with the traveling wind, so that the inside of the vehicle is effectively cooled.

SUMMARY

According to one advantageous aspect of the present invention there is provided, a louver member, configured to be installed on a side cowl so as to cover an air discharge port of a straddle-type vehicle, the louver member including a frame body including a first frame along a first side edge of the air discharge port and a second frame along a second side edge of the air discharge port opposite to the first side edge; a first arm portion crossing the air discharge port from the first frame to the second side frame; and a second arm portion branching from the first arm portion and extending to the second side frame

DETAILED DESCRIPTION

The side cowl is easily deflected by receiving external forces from various directions, and in particular, rigidity in the vicinity of the air discharge port of the side cowl is low. A louver member is attached to the air discharge port of the side cowl in consideration of safety and appearance, but a general louver member cannot sufficiently increase rigidity of the side cowl. Therefore, in order to ensure the comfort of an occupant, a structure for suppressing deflection of the side cowl is desired.

The present invention has been made in view of the above circumstance, and an object thereof is to provide a louver member capable of effectively reinforcing a side cowl with a simple configuration.

A louver member according to an aspect of the present invention is installed on a side cowl so as to cover an air discharge port of a straddle-type vehicle. A frame body of the louver member includes a first frame along a first side edge of the air discharge port and the second frame along the second side edge of the air discharge port opposite to the first side edge, a first arm portion crosses the air discharge port from the first frame toward the second frame, and a second arm portion branching from the first arm portion extends to the second frame. The first frame and the second frame are connected via the first arm portion, the first arm portion and the second frame are connected via the second arm portion, and the louver member is reinforced by the first and second arm portions. Since the first arm portion crosses the air discharge port, the traveling wind passing through the air discharge port is rectified by the first arm portion. By installing the louver member on the side cowl, rigidity of the side cowl is increased without obstructing air discharged from the air discharge port, and deflection of the side cowl is effectively suppressed.

Figure 1:
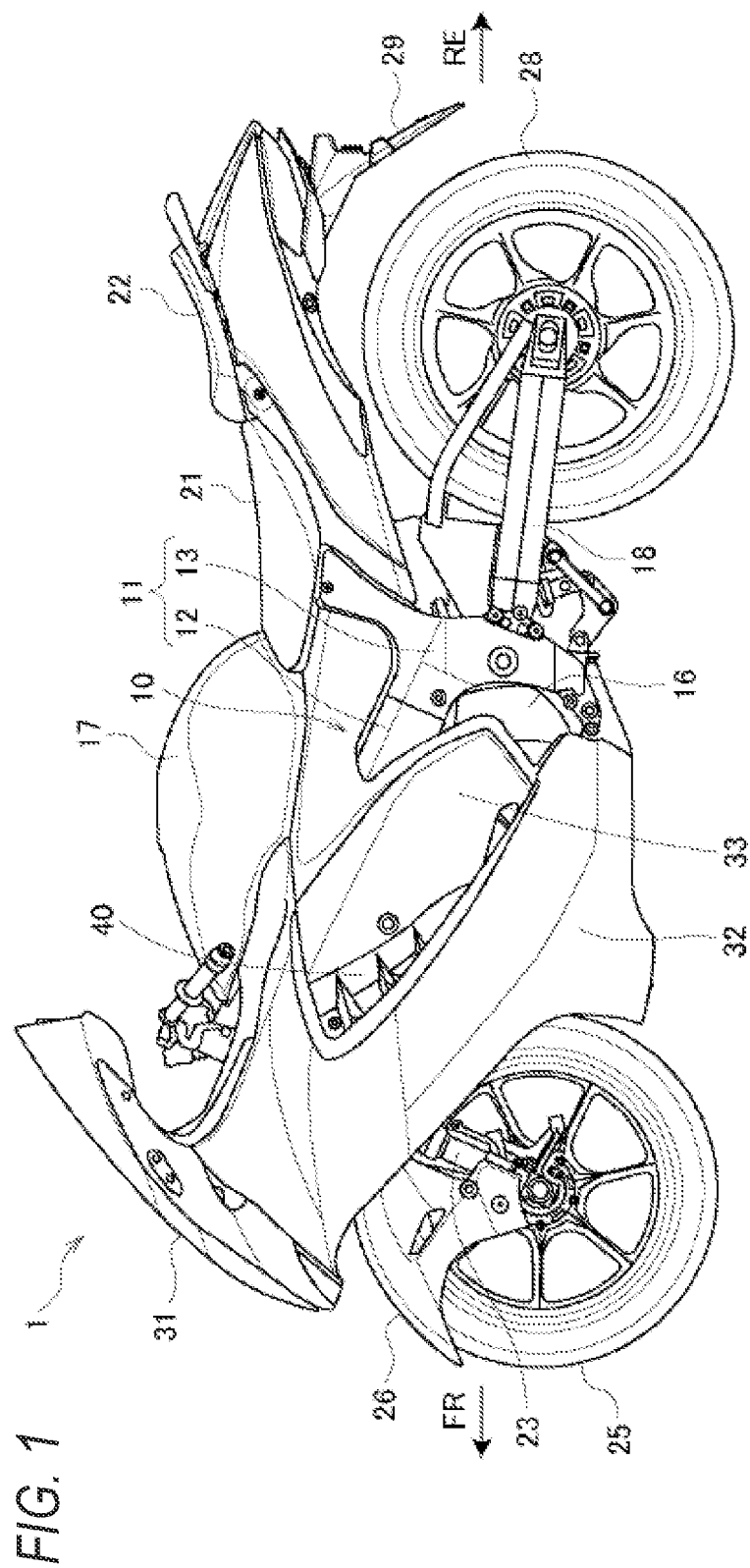
FIG. 1 is a left side view of a straddle-type vehicle according to an embodiment of the present invention.

Hereinafter, the present embodiment will be described in detail with reference to the accompanying drawings. FIG. 1 is a left side view of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 is configured by mounting various components such as an engine 16 and an electrical system on a twin spar-type vehicle body frame 10 formed by aluminum casting. The vehicle body frame 10 includes a pair of main frames 11 branching from a head pipe (not illustrated) to left and right and extending rearward, and a pair of down frames (not illustrated) branching from the head pipe to the left and right and extending downward. A rear portion of the engine 16 is supported by the pair of main frames 11, and a front portion of the engine 16 is supported by the pair of down frames. By supporting the engine 16 with the vehicle body frame 10, the rigidity of the entire vehicle is ensured.

Front portions of the pair of main frames 11 serve as tank rails 12 located above the engine 16, and a fuel tank 17 is supported by the tank rails 12. Rear portions of the pair of main frames 11 serve as body frames 13 located behind the engine 16, and swing arms 18 are swingably supported in substantially intermediate positions in an upper-lower direction of the body frames 13. Seat rails (not illustrated) and a back stay (not illustrated) extend rearward from upper portions of the body frames 13. A rider seat 21 and a pillion seat 22 are supported on the seat rails behind the fuel tank 17.

A pair of front forks 23 are supported on the head pipe via a steering shaft (not illustrated) so as to be steered. A front wheel 25 is rotatably supported by lower portions of the front forks 23, and an upper portion of the front wheel 25 is covered with a front fender 26. The swing arms 18 extend rearward from the body frames 13. A rear wheel 28 is rotatably supported at rear ends of the swing arms 18, and an upper side of the rear wheel 28 is covered with a rear fender 29. The engine 16 is coupled to the rear wheel 28 via a chain drive-type transmission mechanism, and power from the engine 16 is transmitted to the rear wheel 28 via the transmission mechanism.

Some covers are attached to a vehicle body frame 10 of a straddle-type vehicle 1 as vehicle body exteriors. For example, a front surface side of a vehicle front portion is covered with a front cowl 31, and side surface sides of the vehicle front portion are covered with a pair of side cowls 32. Side covers 33 are provided behind the pair of side cowls 32 respectively, and a louver member 40 is installed so as to cover an air discharge port between each side cowl 32 and each side cover 33. Traveling wind is taken into an inside of the vehicle from a lower surface side of the front cowl 31, hot air inside the vehicle is swept away rearward by the traveling wind, and the traveling wind is rectified by the louver members 40 together with the hot air and discharged to an outside of the vehicle from the air discharge ports.

At this time, the traveling wind is blown from the outside of the vehicle onto an outer surface of the side cowl 32, and the outer surface of the side cowl 32 is pushed inward by the traveling wind. The traveling wind is blown from the inside of the vehicle onto an inner surface of the side cowl 32, and the inner surface of the side cowl 32 is pushed outward by the traveling wind. In this way, the side cowl 32 receives traveling wind from various directions and is easily deflected, and in particular, the vicinity of the air discharge port of the side cowl 32 is easily vibrated. Therefore, by forming a louver board of the louver member 40 of the present embodiment with a V-shaped arm portion, the deflection of the side cowl 32 connected to the louver member 40 is suppressed while an influence on discharged air is suppressed.

Figure 2:
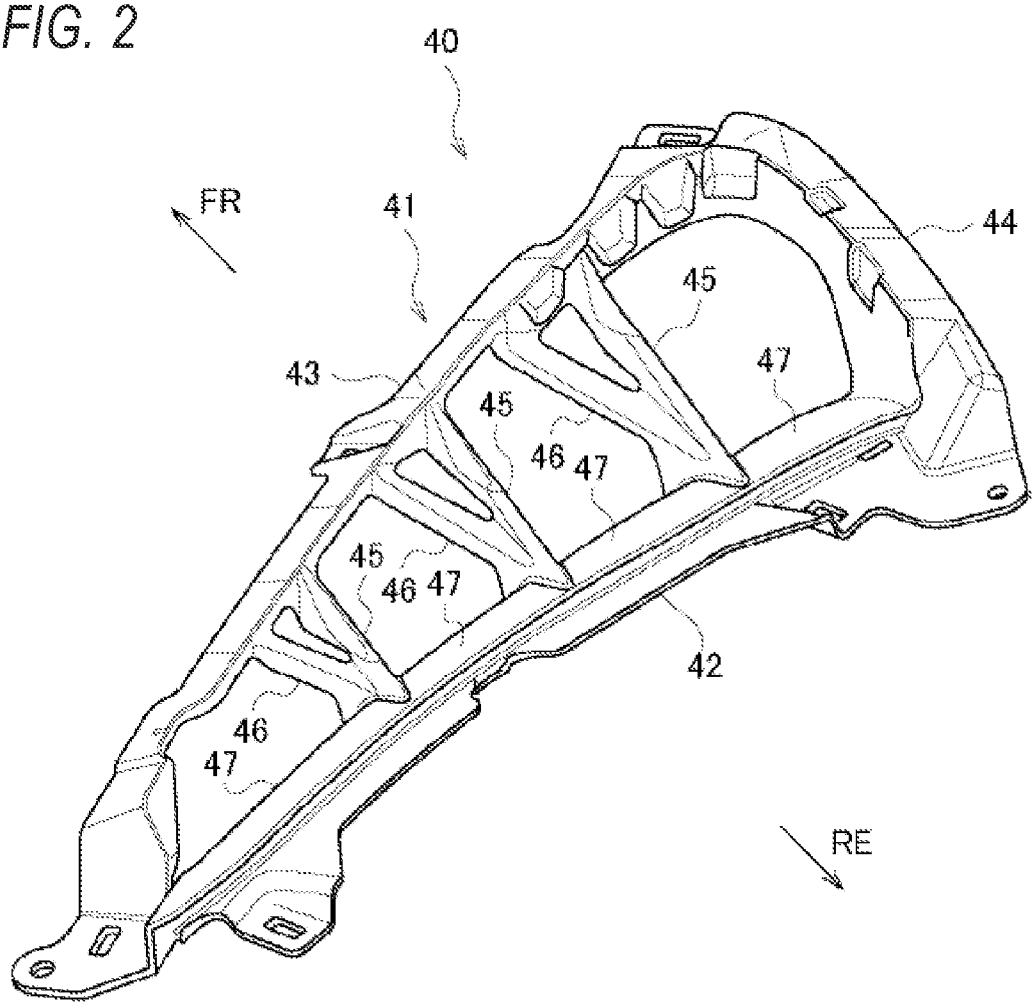
FIG. 2 is a perspective view of a louver member according to the present embodiment when viewed from a vehicle outer side.
Figure 3:
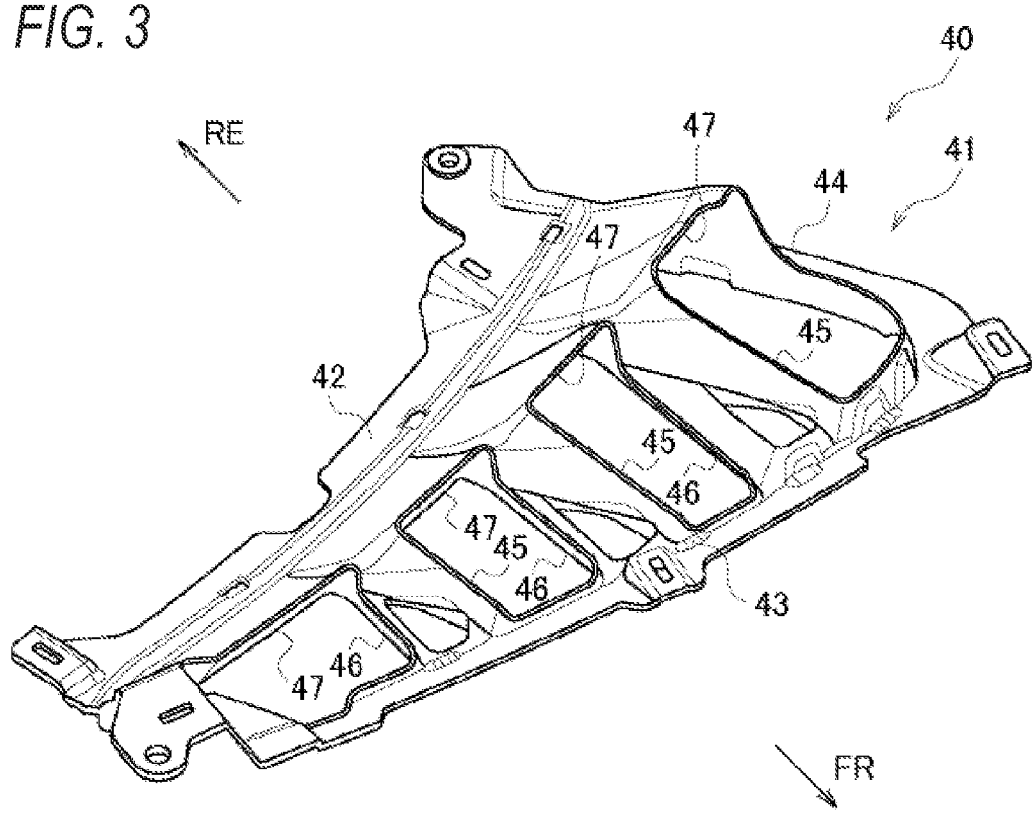
FIG. 3 is a perspective view of the louver member according to the present embodiment when viewed from a vehicle inner side.
Figure 4:
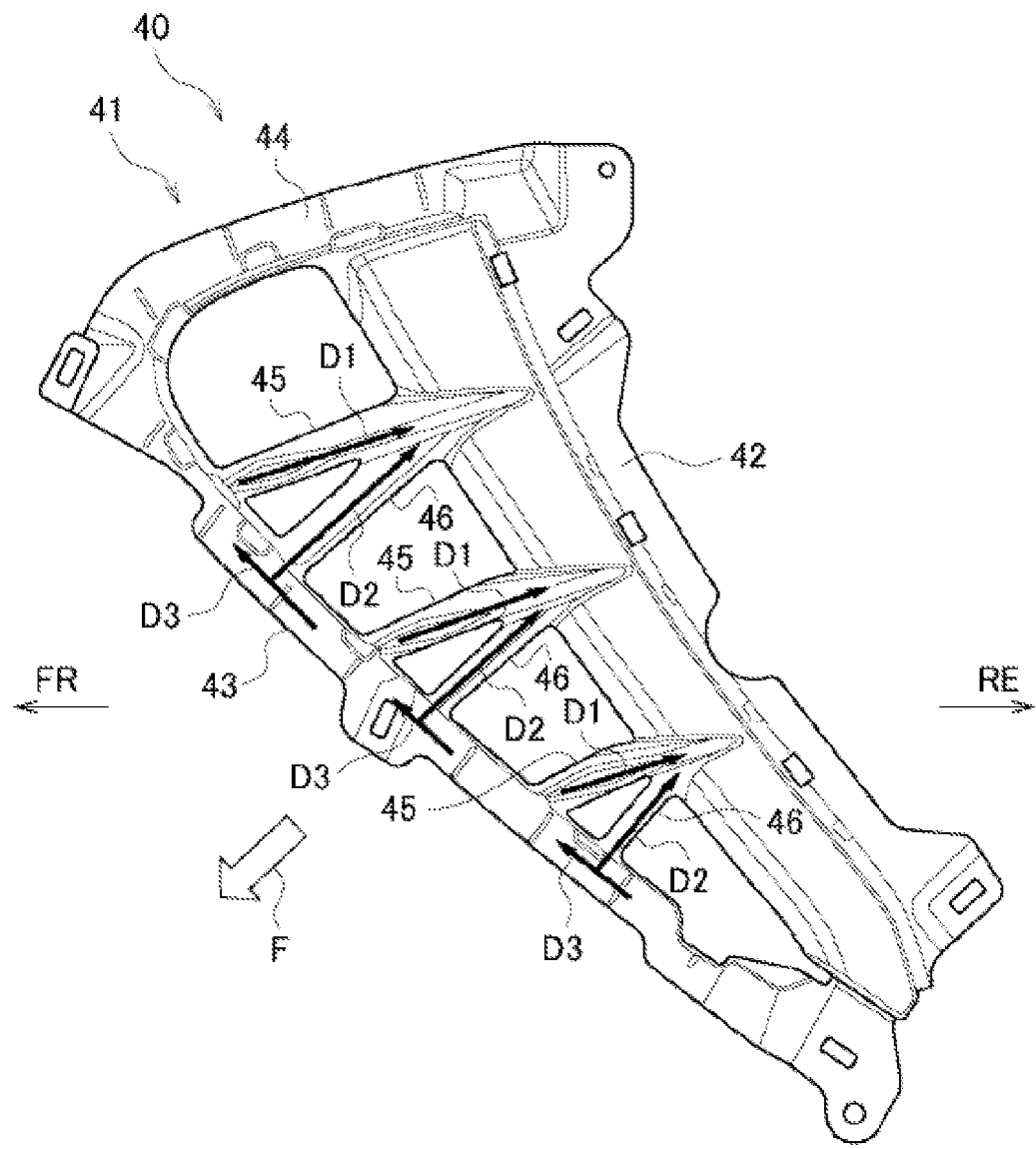
FIG. 4 is a side view of the louver member according to the present embodiment when viewed from the vehicle outer side.
Figure 5:
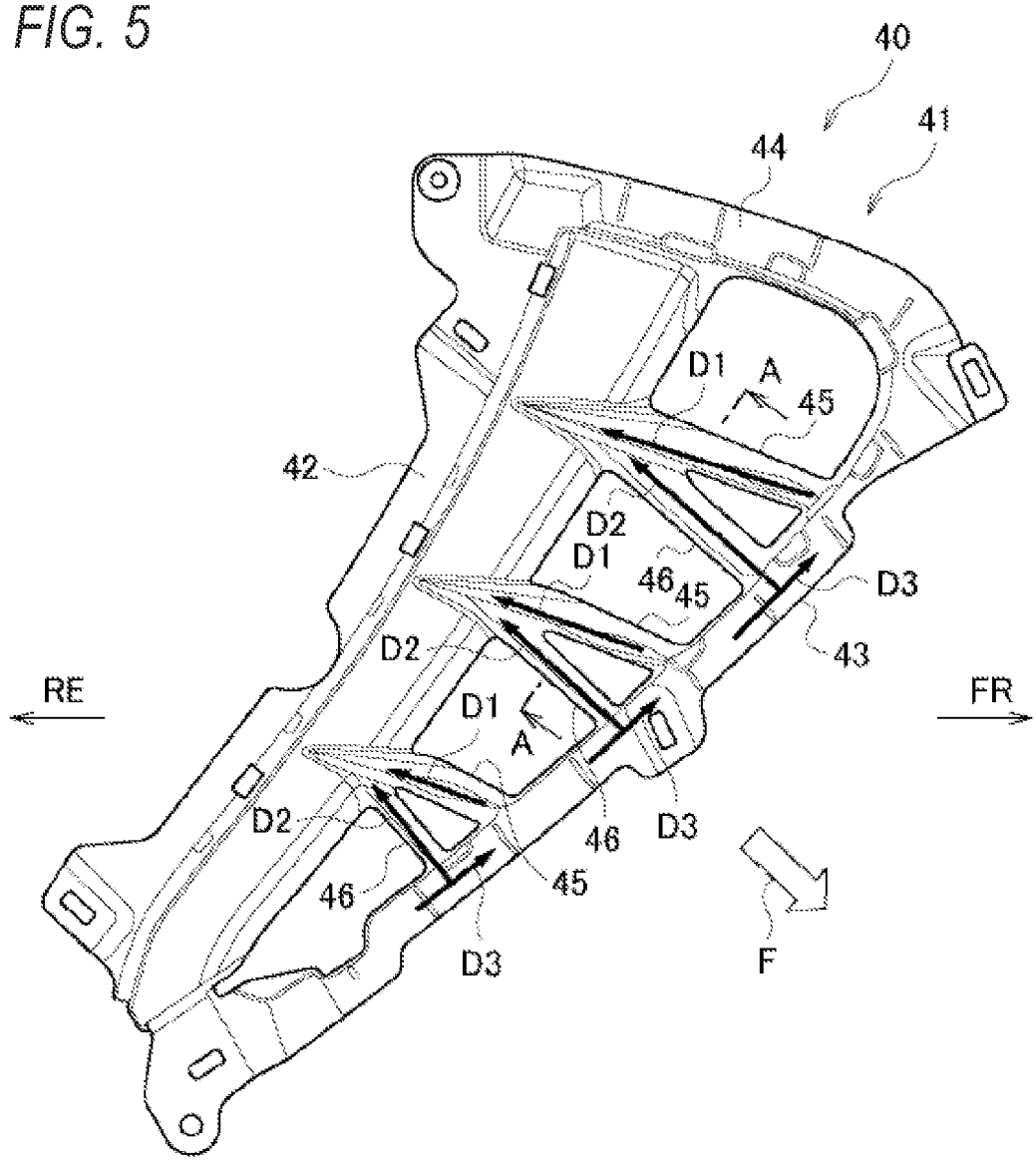
FIG. 5 is a side view of the louver member according to the present embodiment when viewed from the vehicle inner side.
Figure 6:
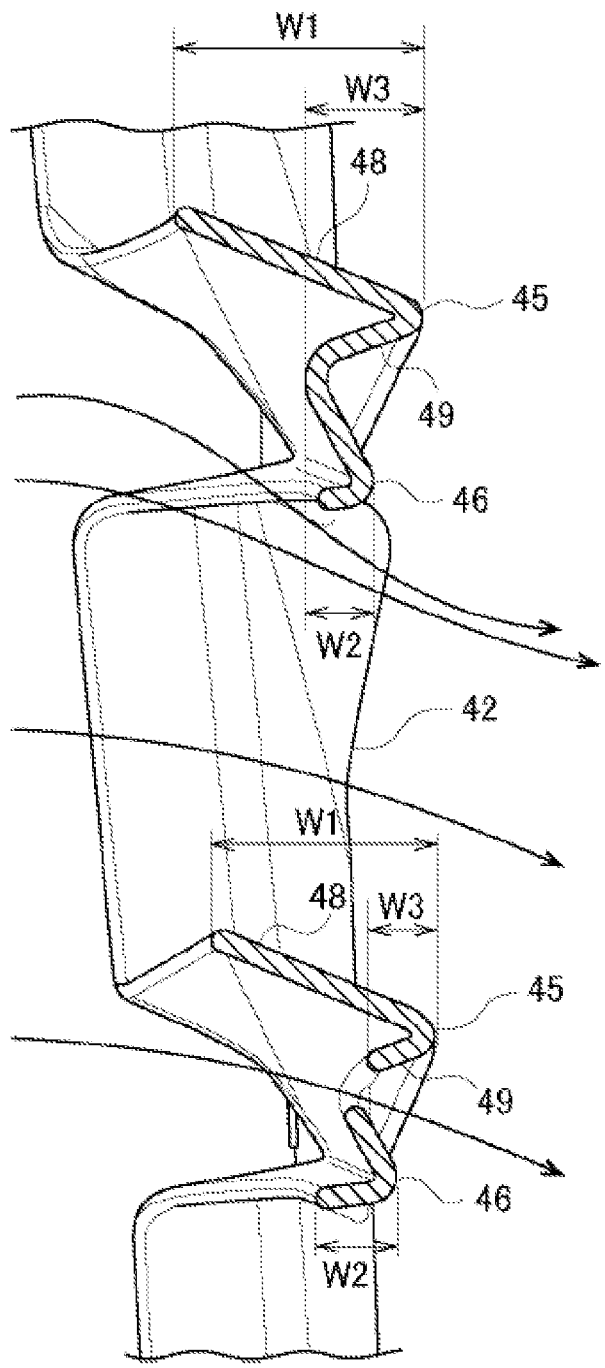
FIG. 6 is a cross-sectional view of the louver member taken along a line A-A in FIG. 5.

Hereinafter, the louver member of the straddle-type vehicle will be described with reference to FIGS. 2 to 6. FIG. 2 is a perspective view of the louver member according to the present embodiment when viewed from a vehicle outer side. FIG. 3 is a perspective view of the louver member according to the present embodiment when viewed from a vehicle inner side. FIG. 4 is a side view of the louver member according to the present embodiment when viewed from the vehicle outer side. FIG. 5 is a side view of the louver member according to the present embodiment when viewed from the vehicle inner side. FIG. 6 is a cross-sectional view of the louver member taken along a line A-A in FIG. 5.

As illustrated in FIGS. 2 and 3, the louver member 40 has a frame body 41 along the periphery of the air discharge port, and a plurality of first and second arm portions 45, 46 each installed in the V shape inside the frame body 41. The frame body 41 is formed in a substantially triangular shape by an inner frame (a first frame) 42 along an inner edge of the air discharge port (a first side edge of the air discharge port), an outer frame (a second frame) 43 along an outer edge of the air discharge port (a second side edge of the air discharge port opposite to the first side edge), and an upper frame 44 along an upper edge of the air discharge port. The louver member 40 is attached to the side cowl 32 (see FIG. 1) such that the inner frame 42 is brought close to the vehicle body frame 10 (see FIG. 1) in a vehicle width direction, and the outer frame 43 is moved away from the vehicle body frame 10 in the vehicle width direction.

The outer frame 43 is formed to be longer than the inner frame 42, and a width of the outer frame 43 is formed to be narrower than that of the inner frame 42. Further, since the outer frame 43 is further apart from the vehicle body frame 10 than the inner frame 42 and the outer frame 43 is formed to be narrower and longer than the inner frame 42, strength of the outer frame 43 is weaker than that of the inner frame 42. The inner frame 42 is located downstream of the outer frame 43 in an air discharge direction (vehicle rear side), and the inner frame 42 is formed with an inclined surface 47 inclined so as to bulge outward in the vehicle width direction toward the vehicle rear side. The traveling wind inside the vehicle is guided to the outside of the vehicle by the inclined surface 47 of the inner frame 42, and an air discharge performance of the louver member 40 is improved.

One end of the first arm portion 45 and one end of the second arm portion 46 are integrated and connected to the inner frame 42, and the other end of the first arm portion 45 and the other end of the second arm portion 46 are individually connected to the outer frame 43.

The first arm portion 45 extends from the inner frame 42 toward the outer frame 43 so as to cross the air discharge port, and the second arm portion 46 branches from one end of the first arm portion 45 and extends toward the outer frame 43 so as to cross the air discharge port. That is, the one end of the first arm portion 45 and the one end of the second arm portion 46 are supported at the same position of the inner frame 42, and the other end of the first arm portion 45 and the other end of the second arm portion 46 are supported at different positions of the outer frame 43.

The first arm portion 45 mainly functions as a rectifying plate, and rectifies the traveling wind flowing from the air discharge port toward the outside of the vehicle. The second arm portion 46 mainly functions as a reinforcing plate, and branches from the first arm portion 45 to reinforce the first arm portion 45 from below. The cross sections of the first and second arm portions 45, 46 are formed in a V shape, and strength of each of the first and second arm portions 45, 46 is increased while suppressing an increase in weight. Convex surfaces of the first and second arm portions 45, 46 having the V-shaped cross section are directed to the outside of the vehicle, and concave surfaces of the first and second arm portions 45, 46 having the V-shaped cross section are directed to the inside of the vehicle.

As illustrated in FIGS. 4 and 5, an extending direction D1 of the first arm portion 45 is horizontal, and the first arm portion 45 extends along a traveling direction of the vehicle. The traveling wind flowing from the air discharge port toward the outside of the vehicle is favorably rectified by the first arm portion 45. Since the first arm portion 45 extends in a horizontal direction, the strength against an external force applied to the louver member 40 from the horizontal direction is increased. Incidentally, the extending direction D1 of the first arm portion 45 being horizontal does not necessarily mean that the extending direction D1 is completely horizontal, and may mean that the extending direction D1 of the first arm portion 45 is regarded as substantially horizontal when the louver member 40 is attached to the vehicle.

An extending direction D2 of the second arm portion 46 is perpendicular to an extending direction D3 of the outer frame 43, and the second arm portion 46 extends in a facing direction of the inner frame 42 and the outer frame 43. Since the second arm portion 46 and the outer frame 43 perpendicularly intersect each other, and the second arm portion 46 is connected to the inner frame 42 and the outer frame 43 at a substantially shortest distance, the louver member 40 is strongly reinforced by the second arm portions 46. Incidentally, the extending direction D2 of the second arm portion 46 being perpendicular to the extension direction D3 of the outer frame 43 does not necessarily mean that the extending direction D2 of the second arm portion 46 is completely perpendicular to the extending direction D3 of the outer frame 43, and may mean that the extending direction D2 of the second arm portion 46 is regarded as substantially perpendicular to the extension direction D3 of the outer frame 43.

Figure 10:
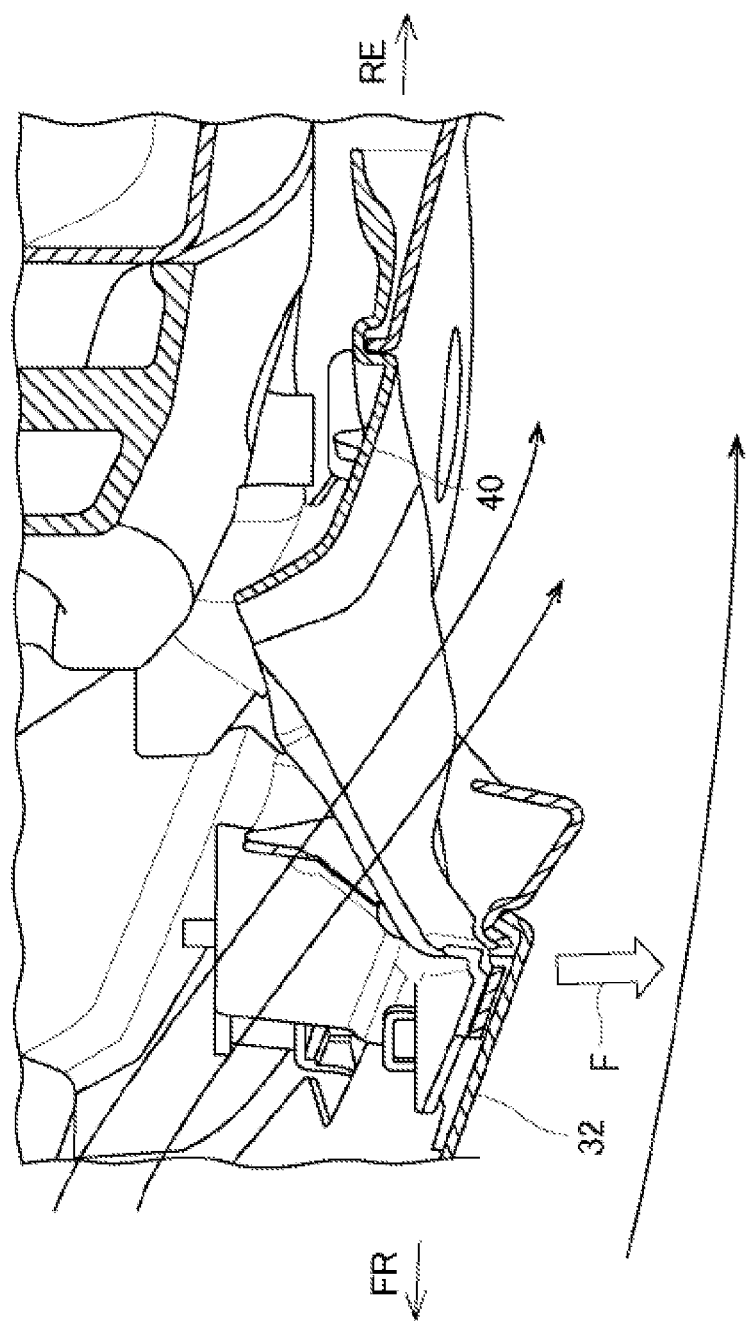
FIG. 10 is a cross-sectional view of the vicinity of a rear end of the side cowl according to the present embodiment.

The outer frame 43 of the louver member 40 is attached to a rear edge of the side cowl 32 (see FIG. 1). When the vehicle travels, traveling wind enters the inside of the vehicle from between the front cowl 31 and the front fender 26, and is swept away toward the air discharge ports of the side cowls 32. At this time, the side cowl 32 is subjected to an external force F such that the side cowl 32 is pulled toward the vehicle outer side due to a difference in atmospheric pressure between the traveling wind on an inner side and the traveling wind flowing on an outer side (particularly, see FIG. 10). Then, the external force F, which is pulled by the side cowl 32 from a direction perpendicular to the outer frame 43, acts on the louver member 40. Since the second arm portion 46 extends in the direction perpendicular to the outer frame 43 similar to the external force F received from the side cowl 32, the second arm portion 46 resists the external force F received from the side cowl 32 by the outer frame 43. Further, since the first arm portion 45 extends horizontally, the first arm portion 45 resists a horizontal component of the external force F of the side cowl 32. The first and second arm portions 45, 46 enhance the resistance of the louver member 40 to the external force F of the side cowl 32. On the other hand, when the side cowl 32 receives an external force toward the vehicle inner side, similarly, the external force toward the vehicle inner side is also applied to the louver member 40, but the resistance of the louver member 40 to this external force is also enhanced by the first and second arm portions 45, 46.

Although the first and second arm portions 45, 46 are warmed by the hot air swept away by the traveling wind, thermal expansion of the first and second arm portions 45, 46 is suppressed by the substantially triangular frame body 41, and an overall rigidity of the louver member 40 is increased. Further, since the one ends of the first and second arm portions 45, 46 are integrated on the inner frame 42, the thermal expansion of one of the first and second arm portions 45, 46 does not greatly affect the strength of the other. Even if a tensile force acts on the louver member 40 due to thermal expansion, the shape of the louver member 40 is ensured.

As illustrated in FIG. 6, a width W1 of the first arm portion 45 is wider than a width W2 of the second arm portion 46 in a top view of the vehicle. Since the width W1 of the first arm portion 45 extending in the horizontal direction is formed to be wide, a rectification effect by the first arm portion 45 is improved, and a change in airflow by the second arm portion 46 is suppressed to be low, so that an air resistance is reduced. The first arm portion 45 is formed to have a V-shaped cross section by an upper plate 48 and a lower plate 49 in order to have high rigidity, but a width W3 of the lower plate 49 is narrower than the width W1 of the upper plate 48. In this way, by forming one of the widths W1, W3 of the upper plate 48 and the lower plate 40 to be narrow, the traveling wind flowing into an inside of the V shape is not retained but easily flows out, and a resistance of the discharged air is reduced. Further, the width W3 of the lower plate 49 becomes narrower from an outer frame 43 side toward an inner frame 42 side, and the cross-sectional shape of the first arm portion 45 is made closer to a flat plate shape from the V shape. Accordingly, the resistance of the discharged air in the vicinity of the inner frame 42 on the downstream side in the air discharge direction is reduced. Since the second arm portion 46 is also formed to have the V-shaped cross section as the first arm portion 45, the second arm portion 46 has an effect of further improving the rigidity and reducing the resistance of the discharged air.

In this way, the first and second arm portions 45, 46 are installed in the V shape between the inner frame 42 and the outer frame 43, and the louver member 40 is reinforced from the inside by the first and second arm portions 45, 46. Since the connection portions of the first and second arm portions 45, 46 with the inner frame 42 are integrated, an influence on the discharged air is suppressed while a simple appearance is maintained. As described above, the strength of the outer frame 43 is weaker than that of the inner frame 42, but the strength of the outer frame 43 is increased by distributing the connection portions of the first and second arm portions 45, 46 with the outer frame 43.

The inner frame 42 is attached to an front edge of the side cover 33 (see FIG. 1), and the outer frame 43 and the upper frame 44 are attached to a rear edge of the side cowl 32 (see FIG. 1), so that the side cover 33 and the side cowl 32 are integrated via the louver member 40. Further, since the louver member 40 is reinforced by the first and second arm portions 45, 46, the rigidity of the side cowl 32 is increased by the louver member 40, and deflection, vibration, and the like of the side cowl 32 are effectively suppressed. For attaching the side cowls 32, the side covers 33, and the louver member 40 to each other, any attachment method of screwing, hooking, and clipping may be used.

Figure 7:
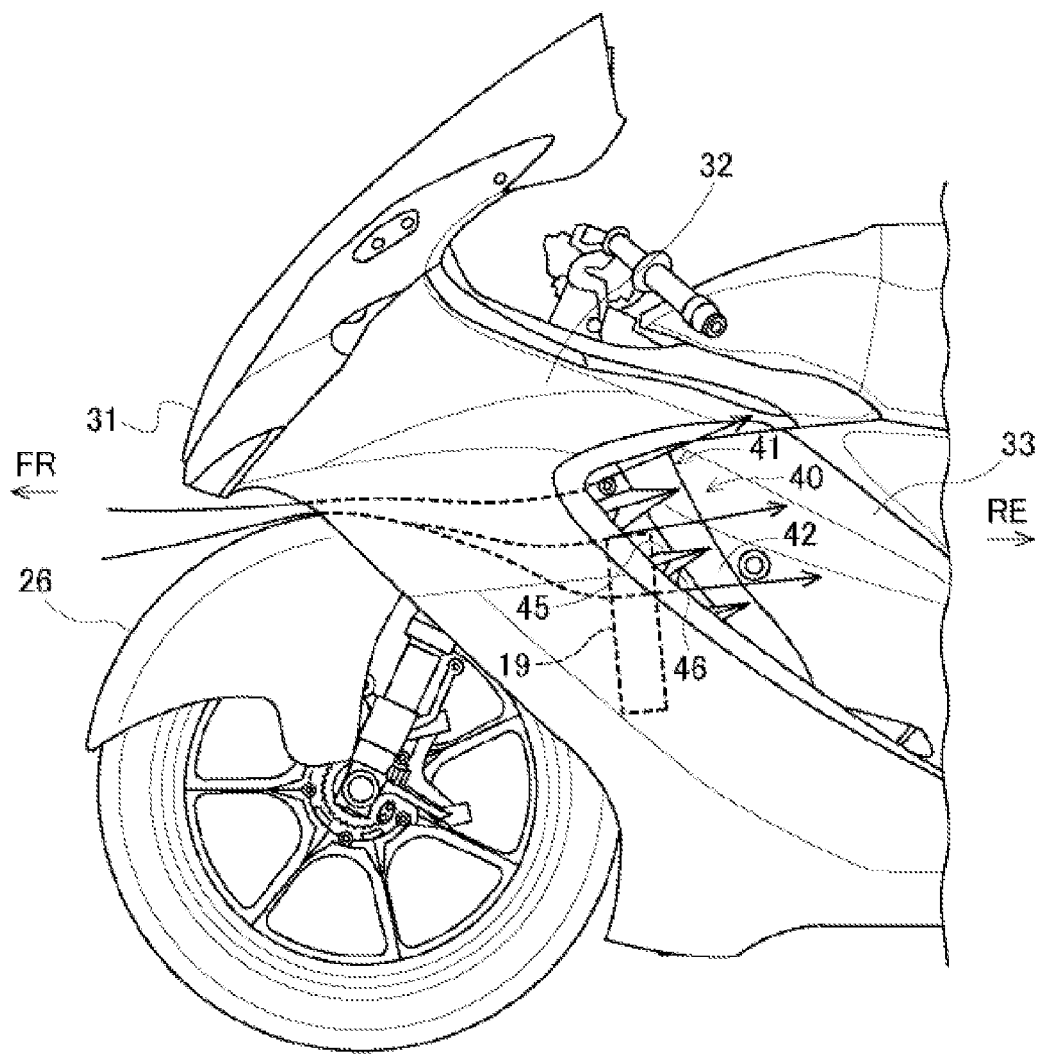
FIG. 7 is a diagram illustrating a flow of traveling wind passing through an inside of a side cowl according to the present embodiment.

A flow of traveling wind passing through an inside of the side cowl will be described with reference to FIG. 7. FIG. 7 is a diagram illustrating the flow of the traveling wind passing through the inside of the side cowl according to the present embodiment.

When the vehicle travels, the traveling wind enters the inside of the vehicle from between the front cowl 31 and the front fender 26. The hot air in the vicinity of the radiator 19 inside the vehicle is swept away toward the air discharge port of the side cowl 32 by the traveling wind. At this time, the traveling wind is blown to the side cowls 32 not only from the inside of the vehicle but also from the outside of the vehicle. A portion of the side cowl 32 bulging outward in the vehicle width direction is attached to the side cover 33 via the louver member 40. Accordingly, rigidity of a portion of the side cowl 32 that is most likely to be deflected is increased, and the deflection of the side cowl 32 is effectively suppressed.

The first and second arm portions 45, 46 are installed in the V shape inside the frame body 41 of the louver member 40, and the frame body 41 is supported from the inside by the first and second arm portions 45, 46. Even if the external force acts on the louver member 40 from the side cowl 32, the external force from the side cowl 32 is received by the first and second arm portions 45, 46. Since the cross sections of the first and second arm portions 45, 46 are formed in the V shape, the louver member 40 is strongly reinforced by the first and second arm portions 45, 46. By improving strength of the louver member 40, the rigidity of the side cowl 32 to which the louver member 40 is attached is increased.

The traveling wind inside the vehicle is discharged from the louver member 40 installed in the air discharge port of the side cowl 32. At this time, the first and second arm portions 45, 46 are provided in the louver member 40, so that the resistance of the discharged air is increased. However, one ends of the first and second arm portions 45, 46 are integrated on the inner frame 42, so that the increase in the resistance of the discharged air on the downstream side in the air discharge direction is suppressed, and the air discharge performance of the louver member 40 is not significantly impaired. Further, in the vicinity of the inner frame 42, since the cross-sectional shape of the first arm portion 45 is brought close to the flat plate shape, the rectifying effect at the time of discharging air is enhanced by the first arm portion 45.

As described above, according to the present embodiment, the inner frame 42 and the outer frame 43 are connected via the first and second arm portions 45, 46, and the louver member 40 is reinforced by the first and second arm portions 45, 46. Since the first arm portion 45 crosses the air discharge port, the traveling wind passing through the air discharge port is rectified by the first arm portion 45. By installing the louver member 40 on the side cowl 32, the rigidity of the side cowl 32 is increased without obstructing air discharged from the air discharge port, and the deflection of the side cowl 32 can be effectively suppressed.

Figure 8:
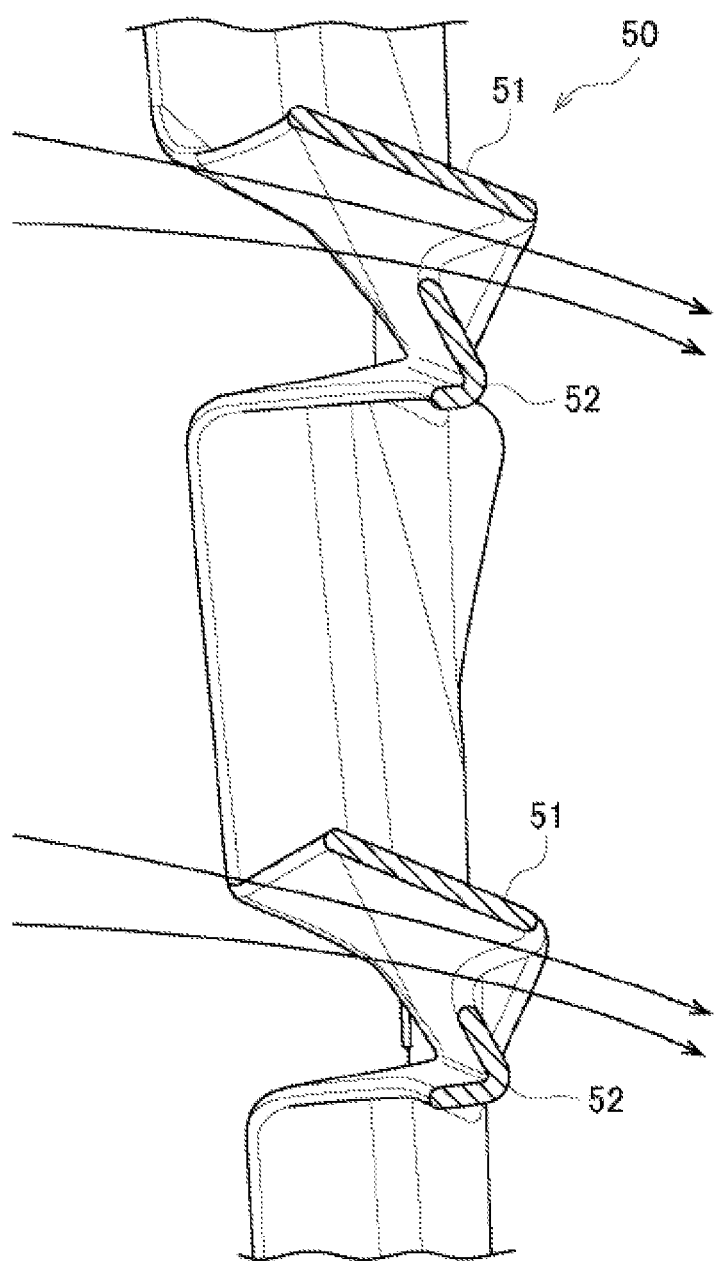
FIG. 8 is a cross-sectional view of a louver member according to a modification.

In the present embodiment, the cross sections of the first and second arm portions are formed in the V shape, but the cross sections of the first and second arm portions are not particularly limited. However, it is preferable that at least one the first and second arm portions has the V-shaped cross section. For example, as illustrated in a modification of FIG. 8, the cross section of the first arm portion 51 may be formed in the flat plate shape, and the cross section of the second arm portion 52 may be formed in the V shape. Accordingly, the first arm portion 51 can enhance the rectifying effect of the traveling wind, and the second arm portion 52 can enhance the strength of the louver member 50.

Figure 9:
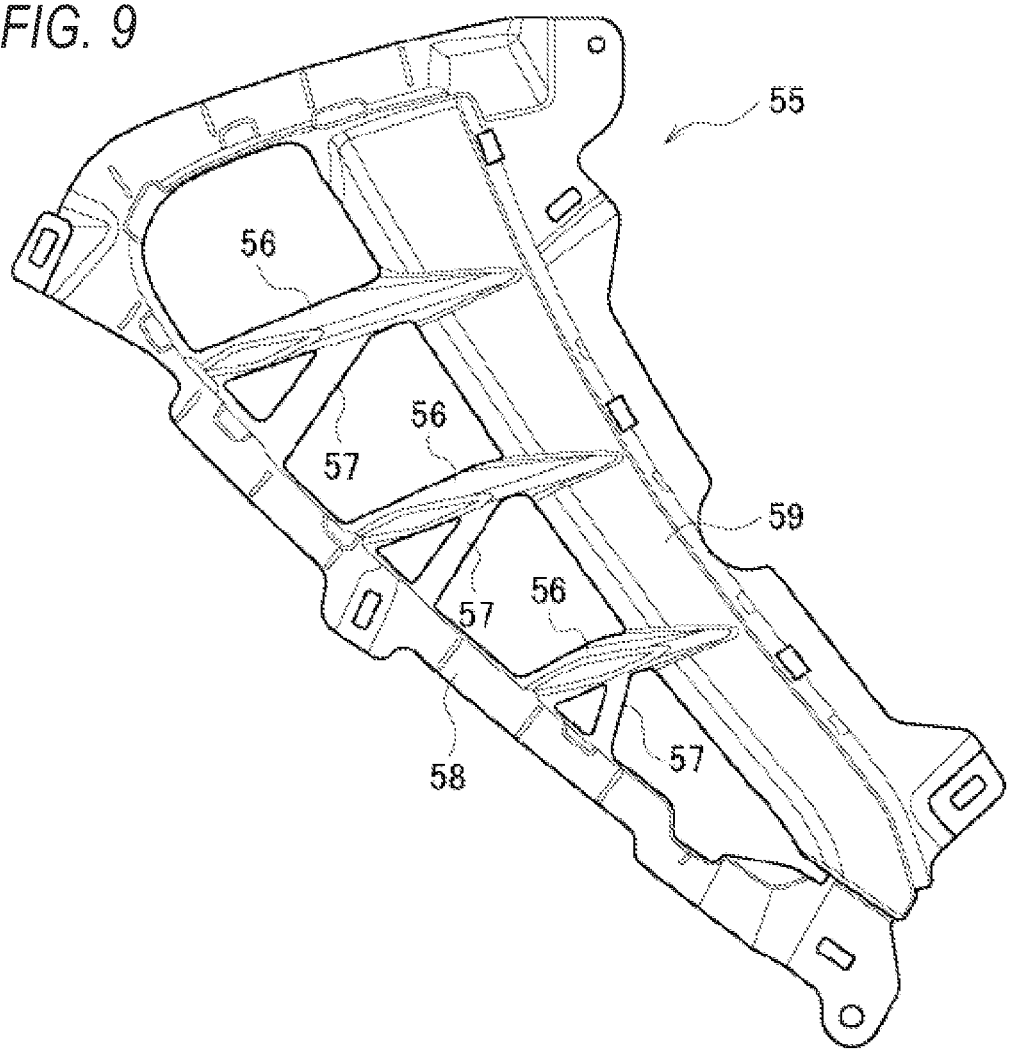
FIG. 9 is a side view of a louver member according to another modification.

Further, in the present embodiment, the second arm portion branches from the one end of the first arm portion and extends to the outer frame, but the second arm portion may branch from the first arm portion and extend to the outer frame. For example, as illustrated in the modification of FIG. 9, the second arm portion 57 may branch from an intermediate position of the first arm portion 56 and extend to the outer frame 58. Even in such a configuration, the strength of the louver member 55 can be increased by the first and second arm portions 56, 57.

Further, in the present embodiment, the frame body and the first and second arm portions are integrally formed, but the frame body and the first and second arm portions may be formed by separate members. Even if the frame body and the first and second arm portions are separate members, a similar effect as that of the louver member of the present embodiment can be obtained.

Further, in the present embodiment, the first frame of the frame body is the inner frame close to the vehicle body frame, and the second frame of the frame body is the outer frame which is disposed outside of the inner frame to be far from the vehicle body frame, but the first frame of the frame body may be along first side edge of the air discharge port, and the second frame of the frame body may be along the second side edge of the air discharge port. Therefore, the first frame of the frame body may be a rear frame on the vehicle rear side, the second frame of the frame body may be a front frame on the vehicle front side, and a distance from the vehicle body frame to the rear frame may coincide with a distance from the vehicle body frame to the front frame.

In the present embodiment, the frame body of the louver member is formed in the substantially triangular shape in the side view, but the shape of the frame body of the louver member is not particularly limited.

Further, in the present embodiment, the outer frame is formed to be longer than the inner frame of the frame body, but the inner frame may be formed to be longer than the outer frame. In this case, the one ends of the first and second arm portions may be integrated and connected to the outer frame side, and the other ends of the first and second arm portions may be individually connected to the inner frame side.

In the present embodiment, the extending direction of the first arm portion is horizontal, and the extending direction of the second arm portion is perpendicular to the extending direction of the outer frame, but the extending directions of the first and second arm portions are not particularly limited. The first and second arm portions may extend so as to reinforce the louver member.

Further, in the present embodiment, the width of the first arm portion is formed to be wider than the width of the second arm portion in the top view of the vehicle, but the width of the first arm portion may be formed to be narrower than the width of the second arm portion.

Further, in the present embodiment, the deflection of the side cowl when receiving the external force toward the vehicle outer side due to the traveling wind is suppressed by the louver member, but the deflection of the side cowl when receiving the external force toward the vehicle inner side caused by a leg portion of an occupant and the like may be suppressed by the louver member. That is, the louver member of the present embodiment is also effective for a vehicle type in which a force is applied to the side cowl at the time of knee grip.

Further, the louver member of the straddle-type vehicle in the present embodiment is not limited to a touring-type motorcycle, and may be applied to a motorcycle of another type. The straddle-type vehicle is not limited to a general vehicle on which a rider rides in a posture of straddling a seat. Alternatively, the straddle-type vehicle further includes a scooter-type vehicle on which a rider rides without straddling a seat.

As described above, a louver member (40) of the present embodiment is installed on a side cowl (32) so as to cover an air discharge port of a straddle-type vehicle (1), and includes a frame body (41) including a first frame (an inner frame 42) along a first side edge of the air discharge port and the second frame (an outer frame 43) along a second side edge of the air discharge port opposite to the first side edge, a first arm portion (45) crossing the air discharge port from the first frame toward the second frame, and a second arm portion (46) branching from the first arm portion and extending to the second frame. According to this configuration, the first frame and the second frame are connected via the first arm portion, the first arm portion and the second frame are connected via the second arm portion, and the louver member is reinforced by the first and second arm portions. Since the first arm portion crosses the air discharge port, traveling wind passing through the air discharge port is rectified by the first arm portion. By installing the louver member on the side cowl, rigidity of the side cowl is increased without obstructing air discharged from the air discharge port, and deflection of the side cowl can be effectively suppressed.

In the louver member of the present embodiment, the second arm portion branches from one end of the first arm portion on a side of the first frame and extends to the second frame. According to this configuration, since the first arm portion and the second arm portion are integrated on the first frame side, the louver member is more strongly reinforced by the first and second arm portions while a simple appearance is maintained.

In the louver member of the present embodiment, an extending direction of the first arm portion is horizontal, and an extending direction of the second arm portion is perpendicular to an extending direction of the second frame. According to this configuration, the louver member is reinforced by the first arm portion, the traveling wind is favorably rectified, and the louver member is strongly reinforced by the second arm portion.

In the louver member of the present embodiment, a width of the first arm portion is wider than a width of the second arm portion in a top view of the vehicle. According to this configuration, a rectifying effect by the first arm portion can be improved.

In the louver member of the present embodiment, at least one of the first arm portion and the second arm portion has the V-shaped cross section. According to this configuration, the louver member can be strongly reinforced and the rigidity of the side cowls can be increased while suppressing an increase in weight.

In the louver member of the present embodiment, the side cowls are fixed to a vehicle body frame of the straddle-type vehicle, the first frame is the inner frame close to the vehicle body frame, and the second frame is the outer side frame which is disposed outside of the inner frame to be far from the vehicle body frame. According to this configuration, the outer frame far from the vehicle body frame is more likely to deflect than the inner frame close to the vehicle body frame. Since connection portions of the first and second arm portions with the inner frame are integrated, an influence of the arm portions on the discharged air is suppressed. Since connection portions of the first and second arm portions with the outer frame are dispersed, deflection of the second frame is suppressed.

In the louver member of the present embodiment, the second frame is longer than the first frame. According to this configuration, since the second frame is formed to be longer than the first frame, the second frame is more likely to be deflected than the first frame. Since the connection portions of the first and second arm portions with the first frame are integrated, the influence of the arm portions on the discharged air is suppressed. Since the connection portions of the first and second arm portions with the second frame are dispersed, the deflection of the second frame is suppressed.

Although the present embodiment has been described, the above-described embodiment and modifications may be combined entirely or partially as another embodiment.

The technique of the present invention is not limited to the above-described embodiment, and various changes, substitutions, and modifications may be made without departing from the spirit of the technical idea of the present invention. The present invention may be implemented using other methods as long as the technical concept can be implemented by the methods through advance of the technology or other derivative technology. Accordingly, the claims cover all embodiments that may be included within the scope of the technical idea.

What is claimed is:

1. A louver member, configured to be installed on a side cowl so as to cover an air discharge port of a straddle-riding vehicle, the louver member comprising:
    a frame body including a first frame along a first side edge of the air discharge port and a second frame along a second side edge of the air discharge port opposite to the first side edge;
    a first arm portion crossing the air discharge port from the first frame to the second frame; and
    a second arm portion branching from the first arm portion and extending to the second frame,
    wherein the second arm portion branches from one end of the first arm portion on a side of the first frame or an intermediate position of the first arm portion and extends to the second frame,
    an extending direction of the first arm portion is horizontal, and
    an extending direction of the second arm portion is perpendicular to an extending direction of the second frame.

2. The louver member according to claim 1, wherein a width of the first arm portion is wider than a width of the second arm portion in a top view of the vehicle.

3. The louver member according to claim 1, wherein at least one of the first arm portion and the second arm portion has a V-shaped cross section.

4. The louver member according to claim 1, wherein the side cowl is fixed to a vehicle body frame of the straddle-riding vehicle, and the first frame is an inner frame close to the vehicle body frame, and the second frame is an outer frame which is disposed outside of the inner frame to be far from the vehicle body frame.

5. The louver member according to claim 1, wherein the second frame is longer than the first frame.

* * * * *